Dec. 29, 1942.  F. J. JAKOVICZ  2,306,884
FRUIT JUICER
Filed Oct. 24, 1940
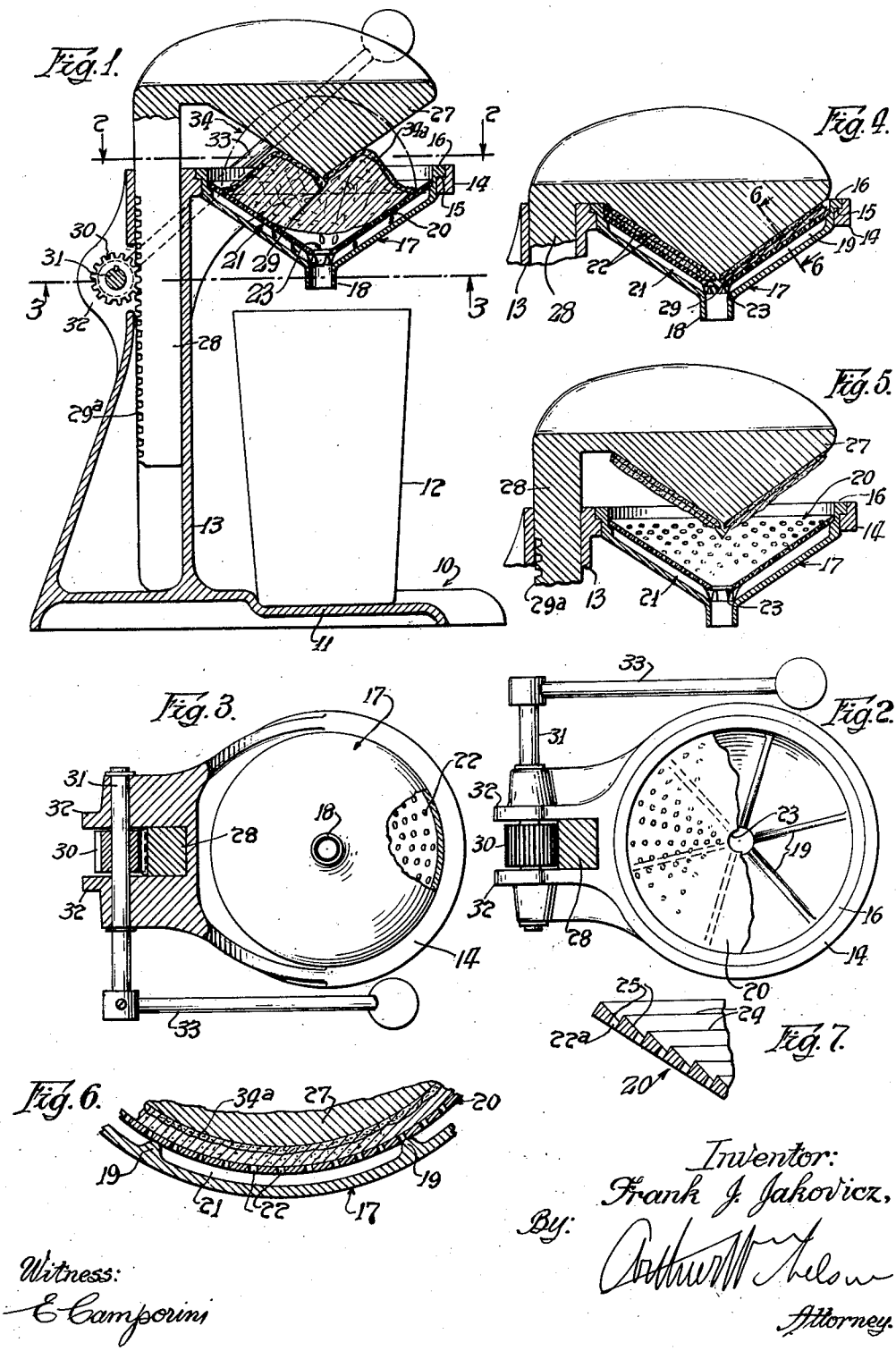
Inventor:
Frank J. Jakovicz,
By:
Attorney.
Witness:
E. Camporini Patented Dec. 29, 1942

2,306,884

UNITED STATES PATENT OFFICE 2,306,884

FRUIT JUICER

Frank J. Jakovicz, Chicago, Ill.

Application October 24, 1940, Serial No. 362,513

2 Claims. (Cl. 100—42)

This invention relates to improvements in fruit juicers and it consists of the matters hereinafter described and more particularly pointed out in the appended claims.

One of the objects of the present invention is to provide a simple and efficient device for fully expressing juice from certain fruits, such as oranges, lemons and grape-fruit, after the latter have been cut into appropriate sections or parts.

Another object of the invention is to provide a fruit juicer which, in the juicing operation, turns the fruit section inside out for a better expressing of the juice therefrom.

Again, it is an object of the invention to provide a fruit juicer having a novel fruit section receiving member, which is so formed that the fruit section operated upon cannot slip out of place but remains in the position best adapted for a more complete expressing of juice therefrom.

Also, it is an object of the invention to provide a fruit juicer wherein the pulp of the fruit section, from which the juice has been expressed, may be more readily removed from the juicer after a juicing operation.

Furthermore, it is an object of the invention to provide a fruit juicer, which is especially adapted for both counter use and home use and which may be readily disassembled or taken apart for washing and cleaning and then as readily reassembled.

The above mentioned objects of the invention, as well as others, together with the several advantages thereof will more fully appear as the specification proceeds.

In the drawing:

Fig. 1 is a vertical sectional view through a fruit juicer embodying therein the preferred form of the invention.

Fig. 2 is a horizontal sectional view through the improved juicer as taken on the line 2—2 of Fig. 1.

Fig. 3 is another horizontal sectional view through the improved juicer as taken on the line 3—3 of Fig. 1.

Fig. 4 is a view of the parts of the improved juicer appearing in Fig. 1 with certain ones thereof in a position changed from that appearing in said Fig. 1.

Fig. 5 is a view similar to Fig. 4 with certain of the parts thereof in a further changed position.

Fig. 6 is a horizontal detail sectional view through certain parts of the improved juicer as taken on the line 6—6 of Fig. 4.

Fig. 7 is a detail vertical sectional view through a modified form of one of the parts of the juicer and which will be more fully referred to later.

Referring now in detail to that embodiment of the invention illustrated in the drawing, the improved fruit juicer includes a horizontally disposed base 10 formed with a seat 11 to receive a juice receptacle in the form of a conventional drinking glass 12. Rising from the base 10, rearwardly of the seat 11, is an upright hollow standard 13 and at the top end thereof is a forwardly projecting, horizontally disposed ring-like flange 14. This flange overhangs the base 10 and is arranged substantially coaxially with the seat 11.

The flange 14 has an upwardly facing shoulder 15 upon which is removably engaged or seated, the shouldered top end portion 16 of a funnel-like body member 17 having a downwardly opening, axially disposed juice discharge spout 18. On the inner surface of the body member 17 is a plurality of upward projections 19 arranged as radially disposed ribs, the purpose of which will soon appear.

20 indicates the member upon which the section of the fruit, such as for an example one-half of an orange, lemon or other juicy fruit, to be operated upon, is initially engaged for the purpose of expressing juice therefrom. This member or its equivalent, which is mentioned in the claims as the "fruit section receiving member" has a funnel-like shape that substantially conforms to the inner surface of the funnel-like body member 17. The member 20 normally rests upon the ribs 19 of said body member, thereby providing a space 21 between the members 17 and 20 and into which juice may flow through openings 22 formed in the member 20 for that purpose. The bottom apex end of the member 20 is provided with a relatively large hole 23, that is arranged coaxially with the spout of the body member.

Preferably, but not necessarily so, the inner surface of the fruit section receiving member 20 may be roughened to provide a gripping surface for the pulp of the fruit operated upon so that the fruit section will not slip relatively thereto. In Fig. 7 I have illustrated one way by which said surface may be roughened as by forming on said surface relatively sharp annular ribs 24 separated by annular grooves 25. There are holes 22a through the member 20 for the passage of juice and these holes are disposed at the bed or bottom of each groove 25 for a better drainage of the juice into the space 21.

27 indicates a plunger or pressure imposing head that is adapted to cooperate with the member 20 in expressing the juice from the fruit section placed upon the inner surface of said member 20. The bottom exterior surface of said plunger or head has a cross sectional contour or shape that conforms to that surface of the member 20 with which it cooperates. Said head is made as a lateral extension of the top end of a vertical rack bar 28 and is arranged coaxially with respect to the members 17 and 20 respectively. It is provided at its bottom with an axially disposed barbed point 29 of a diameter smaller than that of the opening 23 of the member 20 so that it may enter the same as will later appear.

The rack bar 28, which has sliding bearing engagement in guide surfaces provided therefor in the hollow standard, has its teeth 29a on its rear surface. The teeth 29a of said rack bar mesh with a pinion 30 fixed to a shaft 31 arranged transversely of the standard on its rear side toward its top end and this shaft is journalled in laterally spaced bearing ears 32 provided on said side of the standard for this purpose.

The shaft 31 is extended laterally beyond one of the ears 32 and there has secured to it a lever 33 or other suitable member whereby it may be turned. It is apparent that when the lever 33 is swung in one direction, this will impart a downward movement to the rack bar to move the plunger or pressure head into juice expressing position with respect to the member 20. When said lever is swung in the other direction, this will impart an upward movement to the rack bar which will raise or lift the plunger into a position well above the ring 15 to permit the easy placing of a section or cut piece of fruit in the member 20.

In practice, the member 20 has a diameter at the top end which approximates the diameter of, say for example, a relatively small grapefruit or a relatively large orange.

In the operation of the juicer, assume that the operator has cut an orange into two parts or sections and this transversely to its core. One of the sections is then placed with its cut side down as appears in dotted lines at 34 in Fig. 1. At this time the annular edge of the cut side engages the inner surface of the member 20 near its open top.

The operator, after placing a glass 12 in position on the base 10, then swings the lever 33 in a position to move the rack bar and the plunger or head 27 downwardly. As the plunger or head thus moves downwardly, the barb 29 thereon first engages and penetrates the rind 34a of the orange and enters the pulp. Upon further downward movement of the plunger or head, the apex end thereof depresses the central part of the engaged rind and initiates a turning inside out of the orange section to present the pulp portion thereof to the inner surface of the member 20. Further pressure of the plunger or head on the orange section squeezes the same between said plunger or head and the member 20 so that a complete expressing of all juice therefrom is accomplished. As the juice is expressed from the orange section, it runs through the openings 22 in the member 20 into the space 21 and then runs down the inner surface of the member 17 out of the spout 18 into the glass 12.

By swinging the lever in the other direction, the plunger or head is raised or lifted. By reason of the barb 29 having penetrated through the rind of the orange, it will retain the remainder of the orange upon the head and withdraw it from the member 20. When the head is in its uppermost position, the remainder of the orange is easily removed from the head by hand.

It is pointed out that the openings 22 in the member 20 are of such diameter that the seeds of the fruit operated upon cannot pass therethrough and therefore the member 20 functions as a strainer in this respect.

When the inner surface of the member 20 is provided with the ribs 24 and grooves 25 as shown in Fig. 7, said ribs so engage the pulp of the fruit in an expressing operation that the pulp thereof is not crowded in a manner causing it to mass toward the central part of the member 20. When the pulp is held in this manner, it remains more even in its distribution over the inner surface of the member 20, as the orange turns inside out, so that a better juice expressing action is possible.

As the member 20 merely rests or seats on the ribs 19 of the body member and is not fixed thereto by screws or the like, it is easily removable from the body member for washing or cleaning and replacing after each operation, if necessary or desired.

While in describing the invention, I have referred in detail to the form, arrangement and construction of the parts involved, the same is to be considered only in the illustrative sense, so that I do not wish to be limited thereto except as may be specifically set forth in the appended claims.

I claim as my invention:

1. A fruit juicer embodying therein an open top body having a juice discharge opening, a member so disposed in said body as to provide a space therebetween and having an inverted conical upper surface to receive the cut side of the fruit section to be operated upon and which upper surface is formed with a plurality of annular ribs and grooves, said member disposed in said body having openings therethrough at the bottom of the grooves for the passage of juice into said space and body, and a plunger member having an inverted conical bottom surface substantially angularly complemental to the upper surface of the member disposed in said body, said members being relatively movable axially toward and away from each other into and out of juice extracting position, said annular ribs each having a relatively sharp edge so as to grip the annular cut edge of the fruit section and prevent slipping thereof as it turns inside out in the operation of the juicer.

2. A fruit juicer embodying therein an open top body having a juice discharge opening, a member so disposed in said body as to provide a space therebetween and having an inverted conical upper surface to receive the cut side of the fruit section to be operated upon, said surface having a zone formed with circularly disposed rib-like parts spaced to define grooves, there being openings along the bottom of said grooves for the passage of juice into said space, and a plunger member having an inverted conical bottom surface substantially angularly complemental to said upper surface of said member disposed in said body, said members being relatively movable axially toward and away from each other into and out of juice extracting position, said rib-like parts being formed to grip the cut edge of the fruit section and prevent undue slipping thereof and causing the fruit section to be turned inside out in the operation of the juicer.

FRANK J. JAKOVICZ.